No. 803,749. PATENTED NOV. 7, 1905.
E. O. EVANS.
CAR COUPLING.
APPLICATION FILED JAN. 13, 1905.
3 SHEETS—SHEET 2.
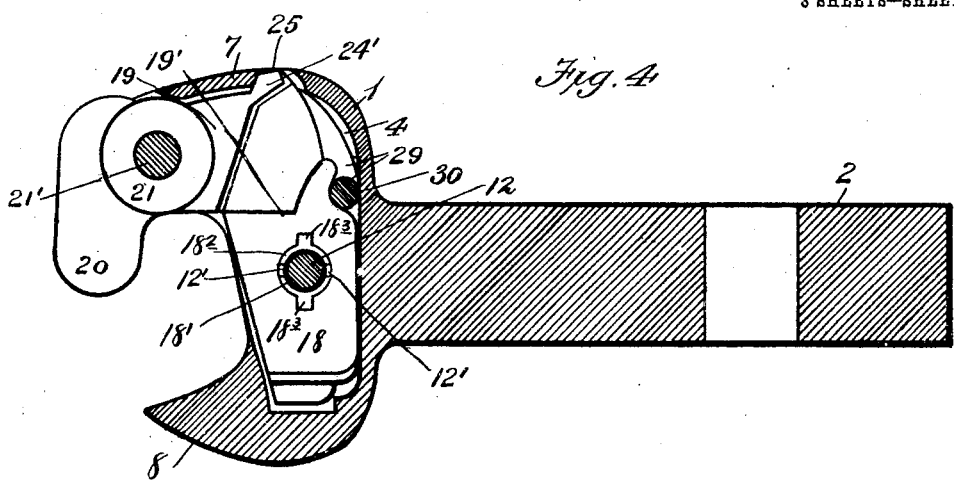
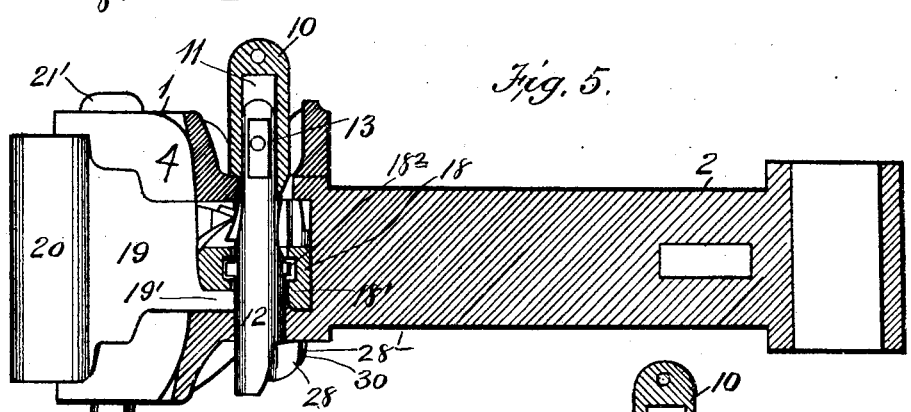
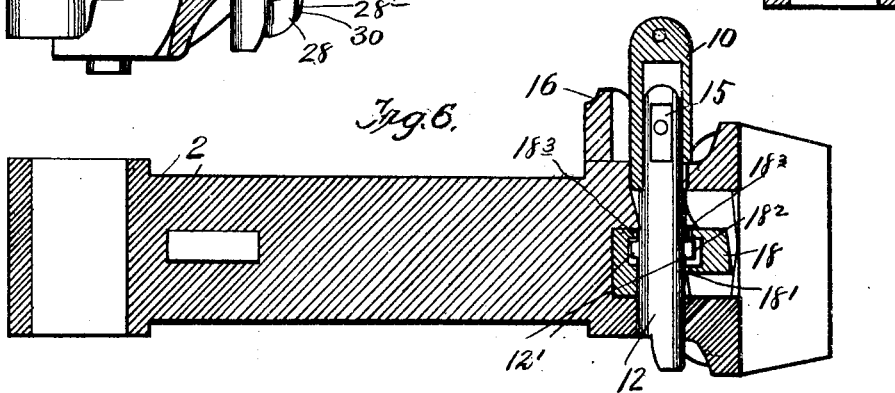

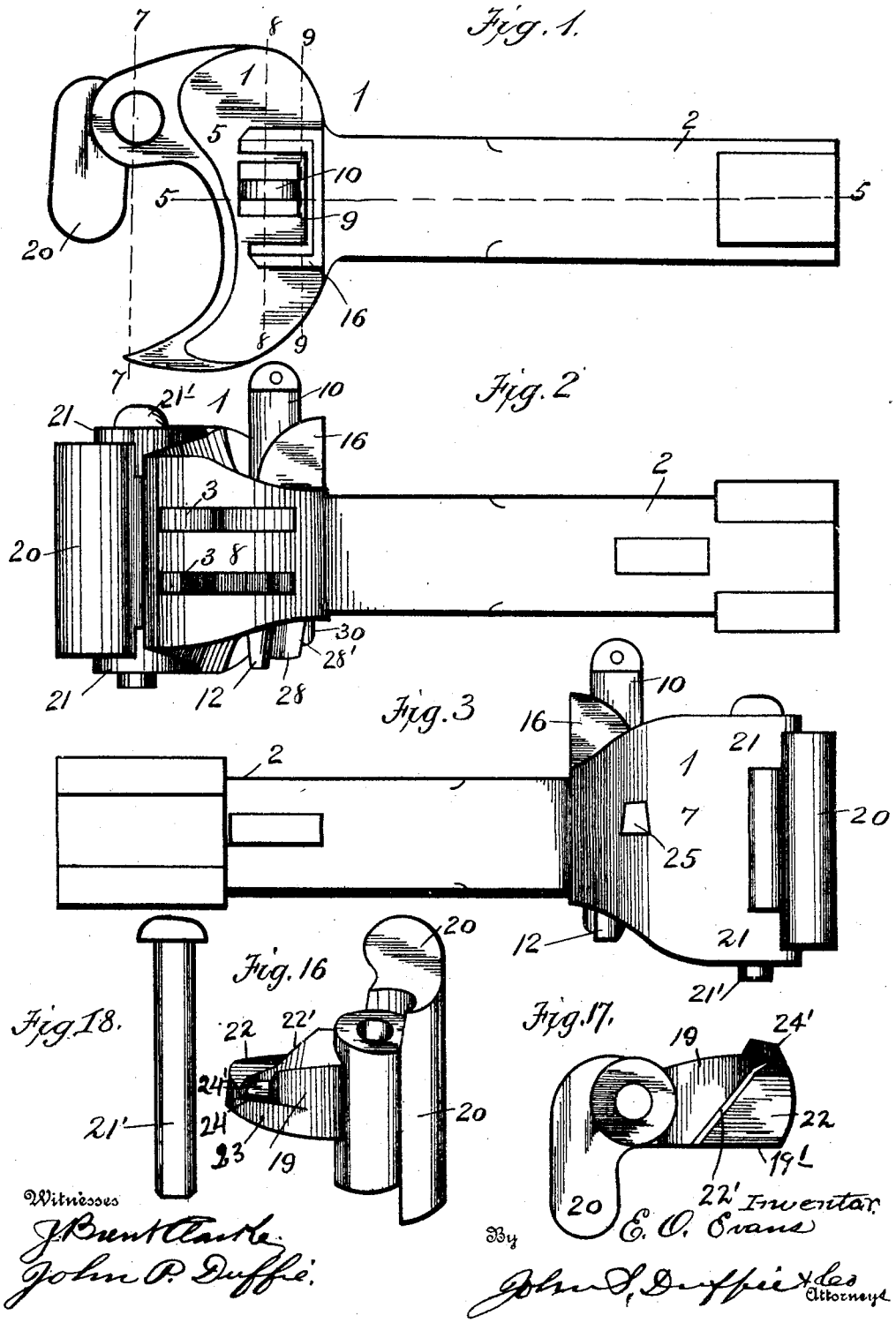

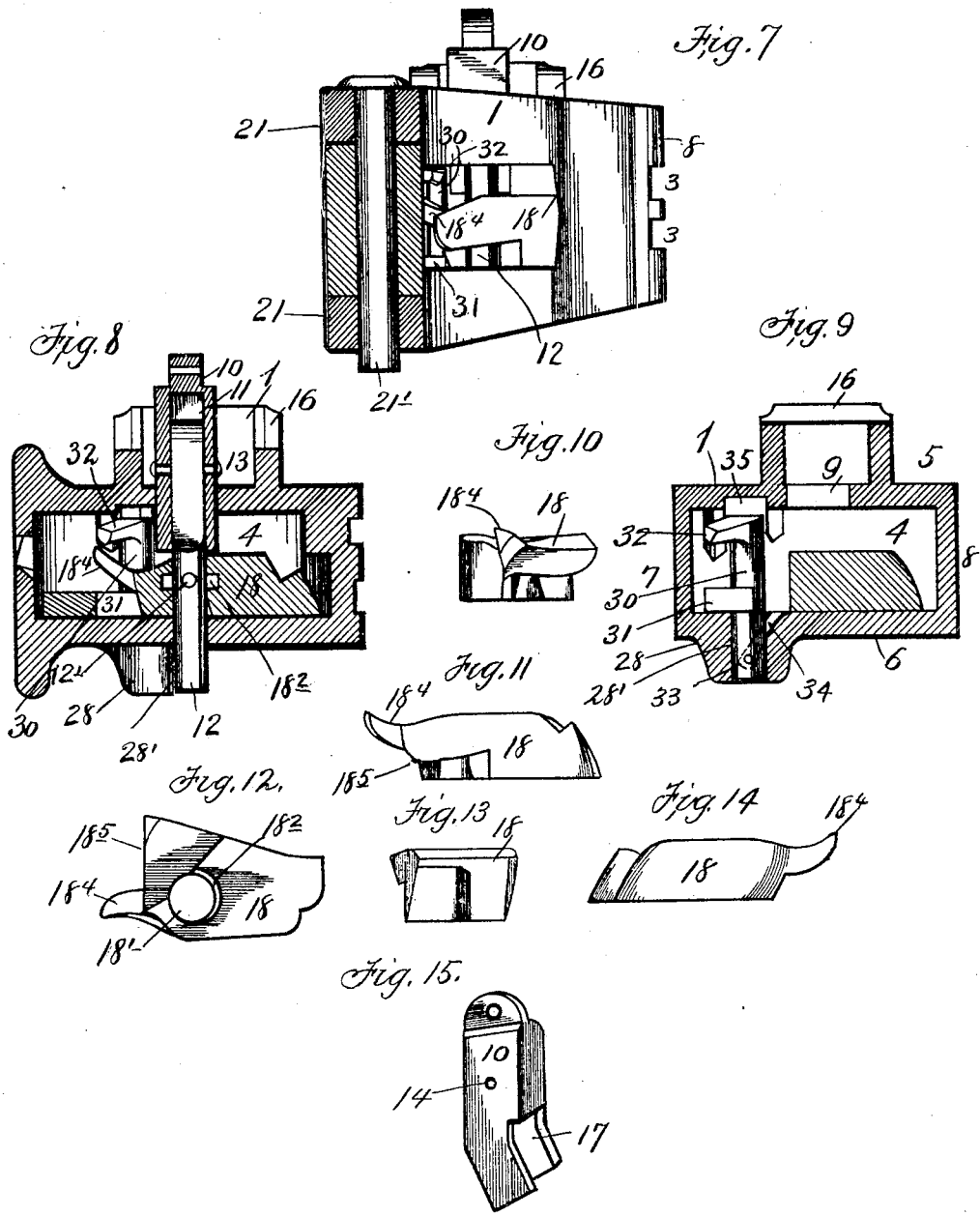

UNITED STATES PATENT OFFICE.

ELMER O. EVANS, OF BURLINGTON, IOWA.

CAR-COUPLING.

No. 803,749.          Specification of Letters Patent.          Patented Nov. 7, 1905.

Application filed January 13, 1905. Serial No. 240,959.

*To all whom it may concern:*

Be it known that I, ELMER O. EVANS, a citizen of the United States, residing at Burlington, in the county of Des Moines and State of Iowa, have invented new and useful Improvements in Car-Couplers, of which the following is a specification.

Our invention relates to car-couplers of that kind or class commonly known as the "Janney" type; and it consists of twin draw-heads each provided with a pivoted knuckle adapted to be automatically opened when the coupling-pin is raised and automatically locked when the pin and hood are allowed to drop back in their places, the hood being so shaped that it will not creep up, and thereby allow the coupler to become uncoupled.

In the accompanying drawings, Figure 1 is a top plan view of my coupler. Fig. 2 is a side elevation looking at the left-hand side of the coupler as shown in Fig. 1. Fig. 3 is a side elevation looking at the right-hand side of the coupler as shown in Fig. 1. Fig. 4 is a horizontal longitudinal sectional view. Fig. 5 is a longitudinal vertical sectional view cut on the line 5 5 of Fig. 1. Fig. 6 is a longitudinal vertical sectional view illustrating the opposite half of the coupler from that shown in Fig. 5. Fig. 7 is a transverse sectional view of the coupler, cut on the line 7 7 of Fig. 1. Fig. 8 is a transverse sectional view of the coupler, cut on the line 8 8 of Fig. 1. Fig. 9 is a transverse sectional view of the coupler, cut on the line 9 9 of Fig. 1. Fig. 10 is an end view of a block used in the coupler. Fig. 11 is a side elevation of a block illustrated in Fig. 10. Fig. 12 is a bottom plan view of a block illustrated in Fig. 10. Fig. 13 is a view of said block, showing the end opposite to that as shown in Fig. 10. Fig. 14 is a view of said block, showing the end opposite to that shown in Fig. 11. Fig. 15 is a perspective view of the hood which is secured to the upper end of the locking-pin. Fig. 16 is a perspective view of the knuckle and knuckle-arm. Fig. 17 is a top plan view of the knuckle and knuckle-arm. Fig. 18 is an elevation of the knuckle-pin.

My invention is described as follows:

The numeral 1 represents the draw-head, which is formed substantially after the Janney type and has extending from its rear part a draw-bar 2 with means for securing it to a car. The outer face of the left-hand jaw is grooved, as shown at 3, for the purpose of lightening or reducing the weight of the draw-head. The draw-bar has extending from its front end rearwardly a hollow 4, leaving an upper wall 5, a lower wall 6, a right-hand wall 7, and a left-hand wall 8. (See Fig. 9.)

Passing down through the upper wall 5 and near the rear end of the hollow 4 is a square perforation 9, in which perforation fits the pin-hood 10. This pin-hood 10 is provided with a vertical opening 11, in which the slotted upper end of the locking-pin 12 fits and works up and down. Said hood is secured to said pin by means of a bolt 13, that passes through a perforation 14 in said hood and the slot 15 in said locking-pin.

Mounted on the upper wall 5 is a housing 16, consisting of three sides, to protect the hood. The lower end of the hood is provided with two legs 17, which project forwardly under the front wall of the perforation 9. The forward projection of the legs keeps the pin from creeping up, and thereby releasing the lock-plate, and thereby releasing the arm 19 of the knuckle 20.

The knuckle 20 is pivoted in two bearings 21, which extend forwardly from the right-hand wall of the draw-head. It is so pivoted in said bearings by the knuckle-pin 21'. The knuckle-arm 19 has on its front face an uppercut recess 22, leaving a vertical wall 22'. Its rear side has an undercut 23, leaving a partly-circular wall 24 and a horizontal projection 24', which when the knuckle is closed protrudes slightly through an opening 25 in the right-hand wall of the draw-head. (See Fig. 3.) The purpose of this projection 24' and opening 25 is to enable any one to give said projection a slight tap with a hammer or rock to open the knuckle in case it should become clogged in its place by ice or other means. The inner face of said knuckle-arm 19 is provided with an uppercut 22, above mentioned, leaving a wall 22', which extends outwardly to the rear of said knuckle-arm.

Extending downwardly from the lower wall of the draw-head is a half-circle projection 28, provided with a recess 28', and running up through the wall is a perforation 29, and in such perforation is secured a bolt 30. Said bolt 30 has extending from its surface horizontally and in the hollow of the draw-head an arm 31, and extending horizontally from said bolt at its upper end is another arm 32. The lower end of said bolt is also provided with a pin 33, which extends horizontally from its surface and below the arm 31. This pin 33 works in a spiral groove 34, made in the inner wall of the perforation 29 and the recess 28' in the projection 28. The upper end of said bolt 30 works in a recess 35 in the lower face of the upper wall of the coupler. This bolt is so constructed in its seat that it can move up and down for a short distance—say about an an inch or more.

The block 18 is provided with an undercut recess $18^5$ for the accommodation of the locking-arm. Said block is also provided with a vertical perforation 18', and running around in said perforation is an annular groove $18^2$. The upper wall of said annular groove is provided with two recesses $18^3$, (see Fig. 4,) immediately opposite each other, and the locking-pin 12 is provided with two short projections 12'. The locking-pin passes down through the perforation 18' in the block 18, and the projections 12' pass through the recesses $18^3$, and then the pin is turned half-way around, bringing said projections into the annular slot $18^2$. Thus when the said pin 12 is raised by pulling on the hood the curved horn $18^4$ of block 18 comes up against the lower face of the arm 32 of the bolt 30 and by reason of its curvature raises said arm and said bolt, inclining said arm to turn inwardly, and while being thus raised the pin 33 of the bolt 30 follows the spiral groove 34 and turns the arm 31 inwardly, said arm thereby coming in contact with the wall 24 of the locking-arm 19, which throws said arm inwardly, and thereby opens the knuckle, and the coupler is thereby uncoupled. When the couplers are thus standing open, the front edge 19' of the locking-arm 19 stands out a little in advance of the rear wall of the hollow in the draw-head and the approaching knuckle strikes it and throws it back, and when thus thrown back the block 18 immediately drops its end $18^5$, dropping against the front face 19' of the locking-arm 19 and locks it in that position. Thus the coupler is locked, and being thus locked the legs 17 of the pin-hood 10 drop down on the upper face of said block and hold it in position, and the block 18 thus holds said locking-arm in position until said hood is raised, and thereby raises the locking-pin, which in turn raises said block 18, which operation sets in motion the bolt 30 of the arms 31 and 32, opening or throwing the knuckle back.

Having described my invention, what I claim as new, and desire to secure by Letters Patent, is—

1. The combination of the draw-head 1, the draw-bar 2, extending from the rear end of said draw-head, the right-hand side of said draw-head provided with an opening 25, and two perforated bearings 21; a knuckle 20, pivoted in said bearings; a locking-arm 19, extending from said knuckle, provided on its rear part with a projection 24', to pass through said first-mentioned opening, and a partly-circular wall 24, and on its rear face, a recess 22, leaving a wall 22'; a half-circle lower projection 28, extending from the lower face of the lower wall of the draw-head provided with a half-circle recess 28', said half-circle recess extending upwardly, forming a circular perforation 29, in said wall, said recess and perforation provided with an upwardly-extending spiral groove 34; a bolt 30, its lower end working in last-mentioned perforation, and its upper end in a recess 35, in the upper wall; a pin 33, extending from the surface of said bolt 30, and working in said spiral groove 34; an arm 31, extending horizontally from said bolt, and working in the hollow of the draw-head, adapted to work against the partly-circular wall 24, on the rear face of the locking-arm 19; an arm 32, extending horizontally from the upper end of said bolt, and on the inside of the hollow of the draw-head; a block 18, extending inwardly from the opposite jaw of the draw-head, provided with an undercut recess for the accommodation of the locking-arm; a vertical perforation 18' in said block 18, having an annular groove $18^2$, with two recesses $18^3$, in the upper wall of said groove; a curved horn $18^4$, extending from the free end of said block 18, and resting under the last-mentioned arm 32, of the above-mentioned bolt 30; a locking-pin 12, having in its upper end a slot 15, and near its middle two projections 12', working in said annular groove $18^2$; a hood 10, working through a square perforation 9, in the upper wall of the draw-head, and over the head of said locking-pin; legs 17, extending downwardly and forwardly from the lower end of said hood 10, and resting on the face of last-mentioned block 18, said hood secured to said locking-pin by a bolt 13, passing through the slot of said locking-pin, and perforations in said draw-head, substantially as shown and described and for the purposes set forth.

2. The combination of the draw-head, having an upper and lower perforated bearing; a draw-bar extending from the rear end of said draw-head; a knuckle, pivoted in said bearings; a locking-arm, extending from said knuckle, provided on its front face with a recess, leaving a wall; a half-circle lower projection, extending from the lower face of the lower wall of said draw-head, provided with a half-circle recess, said half-circle recess extending upwardly, forming a circular perforation in said wall, said recess and perforation provided with an upwardly-extending spiral groove; a bolt, its lower end working in last-mentioned perforation, and its upper end in a recess in the upper wall; a pin, extending from the surface of said bolt, and working in said spiral groove; an arm, extending horizontally from said bolt, and working in the hollow of the draw-head, adapted to work against the partly-circular wall on the rear face of the locking-arm; an arm, extending horizontally from the upper end of said bolt, and on the inside of the hollow of the draw-head; a block, extending inwardly from the opposite jaw of the draw-head, provided with an undercut recess for the accommodation of the locking-arm, and a vertical perforation, having an annular groove, with two recesses in the upper wall of said groove; a curved horn, extending from the free end of said block, and resting under the last-mentioned arm of the above-mentioned bolt; a locking-pin, having in its upper end a slot, and near its middle two projections, working in said annular groove; a hood, working through a perforation in the upper wall of the draw-head, and over the head of said locking-pin, said hood secured to said locking-pin, by a bolt passing through the slot of said locking-pin, and perforation in said draw-head, substantially as shown and described and for the purposes set forth.

3. The combination of the draw-bar; the draw-head, secured to the front end thereof, and having in its wall an opening; a knuckle, hinged in the front end of said draw-head; a locking-arm, extending from said knuckle rearwardly into the hollow of said draw-head; a projection, extending from the rear part of said locking-arm, and adapted to pass through said opening; a bolt, journaled vertically in said draw-head, and having an arm working against the rear face of said locking-arm, and adapted to throw the locking-arm inwardly and open the knuckle, when said arm is turned inwardly, with a block and locking-pin adapted to turn said arm inwardly.

4. The combination of a draw-bar; a head secured to the front end thereof; a knuckle and locking-arm, hinged in the front end of said draw-head; a bolt, vertically journaled in said draw-head, and having a lower arm to throw said locking-arm outwardly, and operate the knuckle, with means for rotating said bolt, substantially as shown and described and for the purposes set forth.

5. The combination of a draw-bar; a draw-head, secured to the front end thereof; a block, adapted to lock the locking-arm of the knuckle, said block provided with an annular groove; a slotted locking-pin, passing down through said draw-head in said block, and secured therein by a projection working in said annular groove, said locking-pin adapted to raise and lower said block, and thereby lock and unlock the locking-arm; a hood, passing up through the upper wall of the draw-head, fitting over the other end of said locking-pin, and provided with legs, passing downwardly and resting on the upper face of said block, and thereby keeping it down, substantially as shown and described and for the purposes set forth.

In testimony whereof I affix my signature in presence of two subscribing witnesses.

ELMER O. EVANS.

Witnesses:
MARGARET J. MERCER,
HERBERT M. MERCER.